(12) United States Patent
Santos Ferreira et al.

(10) Patent No.: US 12,664,604 B2
(45) Date of Patent: Jun. 23, 2026

(54) SYSTEM AND METHOD FOR HIGH-THROUGHPUT IMAGE PROCESSING

(71) Applicants: Lucas Santos Ferreira, Lund (SE); Patrik Persson, Lund (SE); Steffen Malkowsky, Lund (SE); Liang Liu, Södra Sandby (SE); Karl Åström, Lund (SE)

(72) Inventors: Lucas Santos Ferreira, Lund (SE); Patrik Persson, Lund (SE); Steffen Malkowsky, Lund (SE); Liang Liu, Södra Sandby (SE); Karl Åström, Lund (SE)

(73) Assignees: Lucas Santos Ferreira, Lund (SE); Patrik Persson, Lund (SE); Steffen Malkowsky, Lund (SE); Liang Liu, Södra Sandby (SE); Karl Åström, Lund (SE)

( * ) Notice: Subject to any disclaimer, the term of this patent is extended or adjusted under 35 U.S.C. 154(b) by 329 days.

(21) Appl. No.: 18/251,687

(22) PCT Filed: Nov. 5, 2021

(86) PCT No.: PCT/SE2021/051107
§ 371 (c)(1),
(2) Date: May 3, 2023

(87) PCT Pub. No.: WO2022/098289
PCT Pub. Date: May 12, 2022

(65) Prior Publication Data
US 2024/0005445 A1        Jan. 4, 2024

(30) Foreign Application Priority Data
Nov. 6, 2020    (SE) .................................... 2051292-7

(51) Int. Cl.
*G06T 1/60*        (2006.01)
*G06F 12/02*       (2006.01)
(52) U.S. Cl.
CPC ............ *G06T 1/60* (2013.01); *G06F 12/0207* (2013.01); *G06F 2212/1024* (2013.01)
(58) Field of Classification Search
CPC .................. G06T 1/60; G06F 12/0207; G06F 2212/1024; G06F 12/0284; G06F 12/0607; G06F 2212/1028
See application file for complete search history.

(56) References Cited

U.S. PATENT DOCUMENTS

| | | | |
|---|---|---|---|
| 6,028,807 A | 2/2000 | Awsienko | |
| 8,787,705 B1 * | 7/2014 | Hopkins | .............. G11C 7/1042 |
| | | | 382/233 |

(Continued)

FOREIGN PATENT DOCUMENTS

| | | |
|---|---|---|
| GB | 2551188 A | 12/2017 |

OTHER PUBLICATIONS

International Search Report and Written Opinion of the International Searching Authority from the Swedish Intellectual Property Office, in PCT/SE2021/051107 dated Jan. 31, 2022, which is an international application corresponding to this U.S. application.

*Primary Examiner* — John R Wallace
(74) *Attorney, Agent, or Firm* — Kolitch Romano Dascenzo Gates LLP

(57)        ABSTRACT

An image processing method including allocating a plurality of memory banks. Each memory bank includes a plurality of memory bank rows. The image is divided into a plurality of tags, wherein each tag has tag rows, each tag row has a plurality of pixels, and each tag row is consecutively distributed over different memory banks such that each tag row of the tag is accessible to be read out from the memory banks simultaneously. The consecutive distribution of the tag rows (Continued)

S1010
Allocating banks

S1020
Dividing image into tags

S1030
Distributing from tags to banks

S2010
Readout of image is performed by distributing the tag rows (r) in order starting from a first tag row (r) and to the memory banks (b) in order starting at the first memory bank (b), until all tag rows (r) have been distributed.

10 Claims, 6 Drawing Sheets

(56) References Cited

U.S. PATENT DOCUMENTS

2002/0083266 A1*   6/2002   Reuter ...................... G06T 1/60
                                                            711/118
2011/0307459 A1    12/2011   Jacob (Yaakov)
2015/0106567 A1*   4/2015   Godard .............. G06F 12/0864
                                                            711/121

* cited by examiner

SYSTEM AND METHOD FOR HIGH-THROUGHPUT IMAGE PROCESSING

FIELD

The present disclosure relates to methods and systems for image processing.

More particularly, the present disclosure relates to a high-throughput parallel memory organization for storing one or more images over different memory banks.

BACKGROUND

With the current rise of autonomous vehicles, drones, augmented reality applications and much more, the need for robust, fast, and efficient image processing is of great importance.

These systems must typically perform several difficult and computationally intensive tasks in real-time, with a limited energy budget and limited physical size. Especially in the case of autonomous drones and augmented reality applications, both physical size and limited battery capacity is an issue.

Vision based autonomous systems benefits from feature extraction in very large images, summarizing images into meaningful and distinctive fragments. Typically, this step contributes to a significant amount of the processing time and power consumption.

There is thus a need in the art for an improved image processing method.

SUMMARY

In view of that stated above, the object of the present disclosure is to at least partly overcome one or more of the above-identified limitations of the prior art. In particular, it is an object to have an increased memory bandwidth and efficient data access with a high implementation efficiency and a low power consumption.

According to a first aspect there is provided an image processing method, the method comprising the steps of allocating a plurality of memory banks, each memory bank comprises a plurality of memory bank rows, dividing the image into a plurality of tags, wherein each tag comprises tag rows, each tag row comprises a plurality of pixels, and consecutively distributing each tag row over different memory banks such that each tag row of the tag is accessible to be read out from the memory banks simultaneously.

The image processing method is advantageous since consecutively distributing the image to multiple memory banks allows for the image data to be accessible simultaneously. Hence, readout of the image data or pixels can be done in a minimal amount of clock cycles.

After dividing the image into different tags, the tag rows may be distributed linearly over the different memory banks.

By distributing the image sequentially tag-wise, as opposed to distributing the image sequentially pixel by pixel over different memory banks will end up having parts of the same tag, it may reduce the amount of memory accesses as it avoids greatly the necessity of rereads of overlapping data kernels, given the higher throughput. Additionally, the tag wise distribution may allow for access to a programmable tag-array of the image pixel array. In other words, the tag wise distribution may allow for reading and selecting individual pixels within the tag-arrays of each memory bank, such that only those individual pixels that belong to a certain programmable pattern, can be read out to.

According to a second aspect there is provided a system for processing an image, comprising a plurality of memory banks, each memory bank comprises memory bank rows, and an image controller configured to divide an image into a plurality of tags, wherein each tag comprises tag rows, each tag row comprises a plurality of pixels, and consecutively distributing each tag row over different memory banks such that each tag row of the tag is accessible to be read out from the memory banks simultaneously.

The system may be advantageous as the organization of multiple memory banks enables higher throughput, and minimizes the number of rereads. As an image tag can be stored row-wise over different memory banks in tag clusters, the readout of many pixels can be done in a minimal amount of clock cycles, or even a single cycle, which is advantageous in the case of limited bandwidth.

According to a third aspect, an autonomous vehicle, drone, augmented reality device, or other linear algebra accelerators, may comprise a system as mentioned above.

For autonomous vehicles, drones, augmented reality devices and many other devices, it may be advantageous with a robust, fast, and efficient image processing. These systems must typically perform several difficult and computationally intensive tasks in real-time, with a limited energy budget and limited physical size. Specifically, autonomous drones and augmented reality devices, typically has a small physical size and a limited battery capacity, and it is of great importance to be able to carry out image processing efficiently with low power consumption.

In this application, memory banks should be understood as logical storage subunits that is used for storing and retrieving frequently used data, for example subunits together forming a computer memory, software equivalent containers or objects, or a combination of hardware and software components.

Further, in this application, a word should be understood as a fixed-sized piece of data handled as a unit, having a word length being the size of the words given in bytes and corresponding to a number of pixels.

Functions and operations of the system for image processing 300 may be embodied in the form of executable logic routines (e.g., lines of code, software programs, etc.) that are stored on a non-transitory computer readable medium such as a memory. The logic routines may be executed by a control circuit such as a processor. Furthermore, the functions and operations of the system for image processing 300 may be a stand-alone software application or form a part of a software application that carries out additional tasks related to a system for image processing 300. The described functions and operations may be considered a method that the corresponding device is configured to carry out. Also, while the described functions and operations may be implemented in software, such functionality may as well be carried out via dedicated hardware or firmware, or some combination of hardware, firmware and/or software.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above and other aspects of the present disclosure will, in the following, be described in more detail with reference to appended figures. The figures should not be considered limiting; instead, they should be considered for explaining and understanding purposes. As illustrated in the figures, the size and number of elements and regions may be exaggerated or reduced for illustrative purposes and, thus, are provided to illustrate the general structures. Like reference numerals refer to like elements throughout.

DETAILED DESCRIPTION

The present disclosure will now be described more fully hereinafter with reference to the accompanying drawings, in which examples of the present disclosure are shown. This invention may, however, be embodied in many different forms and should not be construed as limited to the examples set forth herein; rather, these examples are provided for thoroughness and completeness, and fully convey the scope of the present disclosure to the skilled person.

In applications where limited battery capacity and physical size is an issue, efficiency, and operations on a minimal amount of clock cycles is of great importance. There is a need for an image processing method with a heavily reduced amount of memory accesses.

Figure 1:
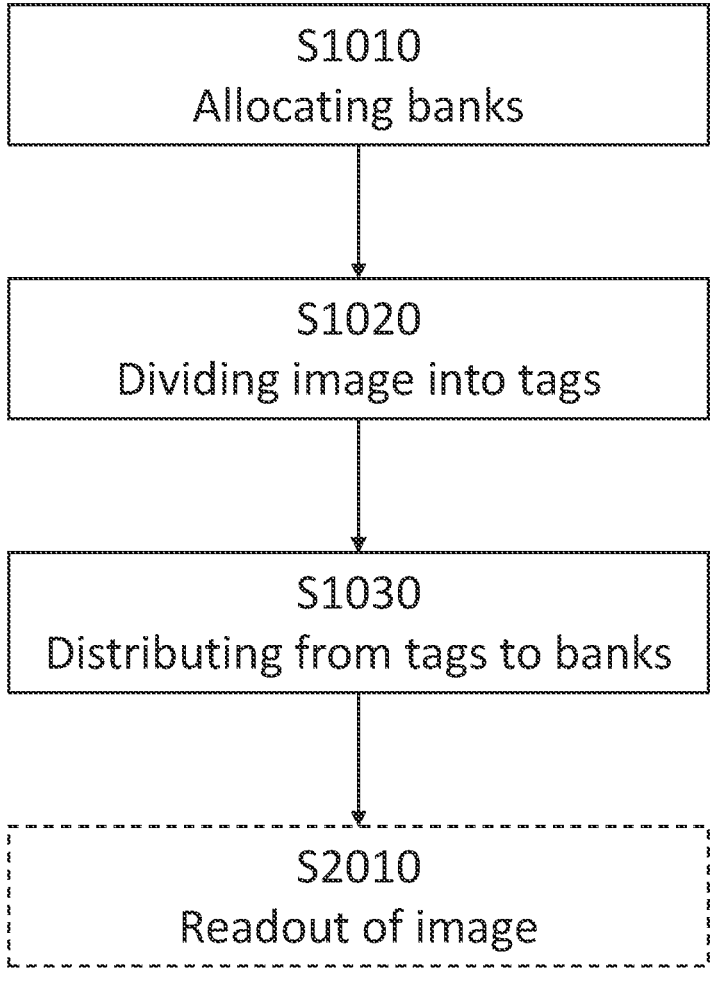
FIG. 1 discloses a flow chart for methods of image processing.

FIG. 1 shows a flow chart of a method for image processing wherein a plurality of memory banks is used to at least partly reduce processing time, power consumption and/or the number of required memory accesses. Optional steps are indicated by dashed boxes in the flowchart.

Figure 3:
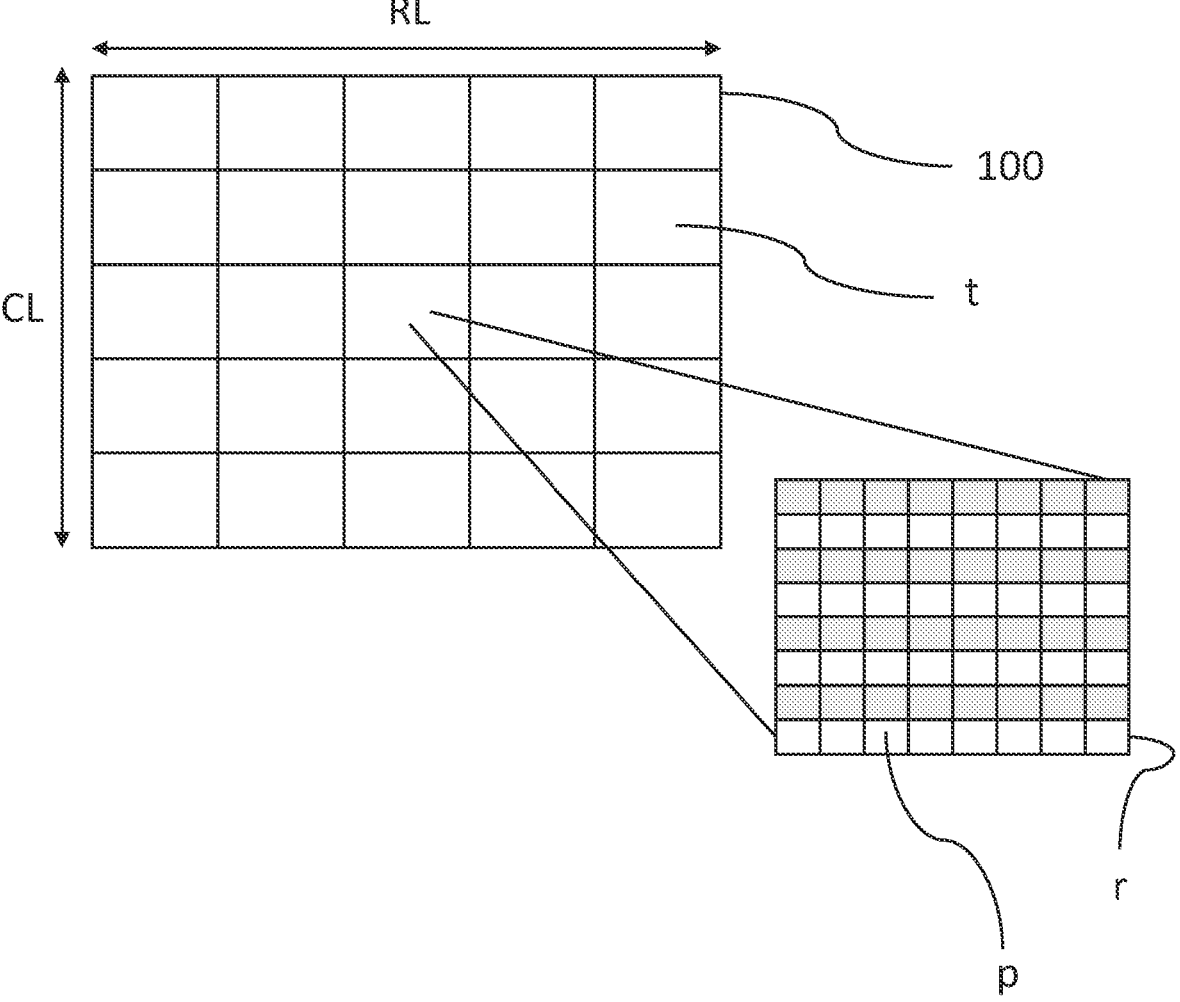
FIG. 3 discloses an image comprising tags.

The method comprises allocating S1010 a plurality of memory banks b. each memory bank b comprises a plurality of memory bank rows d. The method further comprises dividing S1020 the image into a plurality of tags t. Each tag t comprises tag rows r, and each tag row r comprises a plurality of pixels p, as shown in FIG. 3.

As an example, a VGA image of 640×480 pixels may be divided into 20×60 tags, each tag containing 8 tag rows of 32 pixels each. In this case, the number of memory banks may be chosen to be at least eight.

The method further comprises consecutively distributing (S1030) each tag row r over different memory banks b such that each tag row r of the tag t is accessible to be read out from the memory banks b simultaneously.

In the above stated example, a tag row r may comprise 32 pixels p. Each image pixel location $p(x,y)$ can be transformed into a memory bank index $B(b,d)$. Using the above stated example again, the first tag row r of the first tag t of the image 100 may be distributed to the first memory bank row d of the first memory bank b. The second tag row r of the first tag t of the image 100 may be distributed to the first memory bank row d of the second memory bank b. The third to the eight tag rows r of the first tag t of the image 100 may be consecutively distributed to the first memory bank row d of the third to eighth memory banks b. Yet another tag row r of the second tag t of the image 100 may be distributed to the second memory bank row d of the first memory bank b. The remaining tag rows r may be consecutively distributed following the same order of distribution such that $T(2,2)$ →$B(2,2)$, $T(2,3)$→$B(3,2)$, $T(2,4)$→$B(4,2)$, and so on.

The image processing method may be advantageous as it enables an organization of multiple memory banks of embedded memories where image data can be divided and distributed into different memory banks in a highly efficient way. As an image tag is stored row-wise over different memory banks in tag clusters, the readout can be done in a minimal amount of clock cycles.

According to some examples, the consecutive distribution of the tag rows is performed by distributing the tag rows r in order starting from a first tag row r and to the memory banks b in order starting at the first memory bank b, until all tag rows r have been distributed.

Such a distribution may reduce the amount of memory accesses as it avoids greatly the necessity of rereads.

Specifically, if the number of tags is K, and the number of tag rows is M, the pixels p may be distributed from a tag index $T(t,r)$ to a memory bank index $B(b,d)$ by a first increment of one from 1 to M by tags rows r and memory banks b, then by a second increments of one step by tags t and memory bank rows d, and then iterating the first and second increments alternatingly until t=K and r=M.

According to some examples, the distribution may be done in parallel such that pixels from several tag indexes can be distributed to several memory bank indexes simultaneously.

According to some examples, the distribution may be done in a noncontinuous way. Alternatively, the distribution may be ordered or unordered, performed in a pattern or at random.

According to some examples, there may be at least a same number of memory banks b as tag rows r. Additional memory banks can be used to accommodate a higher throughput of a hardware accelerated implementation without loss of generality. Alternatively, number of tags per image row may be equal to an uneven quotient of number of pixels per row and word length, making for instance the number of tags per row a multiple of power of two, simplifying the implementation of the address generation unit.

According to some examples, the plurality of allocated memory banks b may be selected based on a column length CL of the image being divisible by the plurality of memory banks b.

According to some examples, the pixels in each tag row r may be selected as an even quotient of a row length RL of the image.

According to some examples, the tags t may be selected based on the column length and row length of the image.

This may be advantageous as it can reduce the amount of memory accesses and increase the number of tags and pixels being read each clock cycle.

As an example, when processing a VGA image (640×480 pixels), it can be divided into 20×60 tags, each tag containing 8 rows of 32 pixels each. If the number of memory banks is chosen to be eight, and the number of memory ports are two, up to two full tags per period can be read per period according to the method, resulting in a total of 512 pixels being read.

Additionally and for example, from these pixels any combination of pixels that belong to a pattern, as examples, a Bresenham circle, 3×3, 5×5, 7×7 patches, a Binary Robust Independent Elementary Features (BRIEF) access pattern and its variations, or a combination of, may be selected as the memory read output.

According to some examples, each memory bank row d may comprise a tag index $T(t,r)$, tag row offset, and a byte offset.

This may be advantageous as it allows transformation from pixel to memory location in an efficient way and thereby reducing the amount of memory access.

Specifically, the transformations from pixel to memory bank index, tag index, and word offset, p(x,y)→B (b,d), p(x,y)→T(t,d), p(x,y)→W$_{offset}$ may be given by $$B(b, d) = [(y - 1) \% \ N]$$

$$T(t, r) = \left[\frac{y-1}{N}(\# \ \text{Tags/row})\right] + \left[\frac{x-1}{WL}\right]$$

$$T(t, r) = \left[\frac{y-1}{N}\left(\frac{ImgCols}{WL}\right)\right] + \left[\frac{x-1}{WL}\right]$$

$$W_{offset} = [(x - 1) \% \ (WL)]$$

Where N is the number of memory banks, and WL is the wordlength given in number of bytes, and corresponding to number of pixels.

As pixels can have different sizes and thereby different amounts of bytes per pixels, the wordlength can be equal to or greater than the number of pixels.

According to some examples, the method may further comprise the step of performing a readout of the image S2010 by sorting out specified pixel information in a requested reading pattern 201 of the tag t stored in the different memory banks b.

This may be advantageous as the readout can be performed on a reduced set of pixels, by sorting out the different pixels belonging to the different patterns from words in one cycle. Accessing more pixels at the same time increases throughput, avoids rereading, lowers the overall amount of memory access, and ultimately saves power.

More specifically, the readout may comprise a step of determining which addresses must be fetched, followed by selecting the appropriate
pixels given the pattern.

According to some examples, the step of performing a readout S2010 may comprise accessing the memory bank b by at least one port q connected to the memory bank b such that at least one memory bank row d can be read out simultaneously.

According to some examples, there may be at least a same number of ports q as tag rows r. Additional ports can be used to accommodate a higher throughput of a hardware accelerated implementation without loss of generality.

Figure 4:
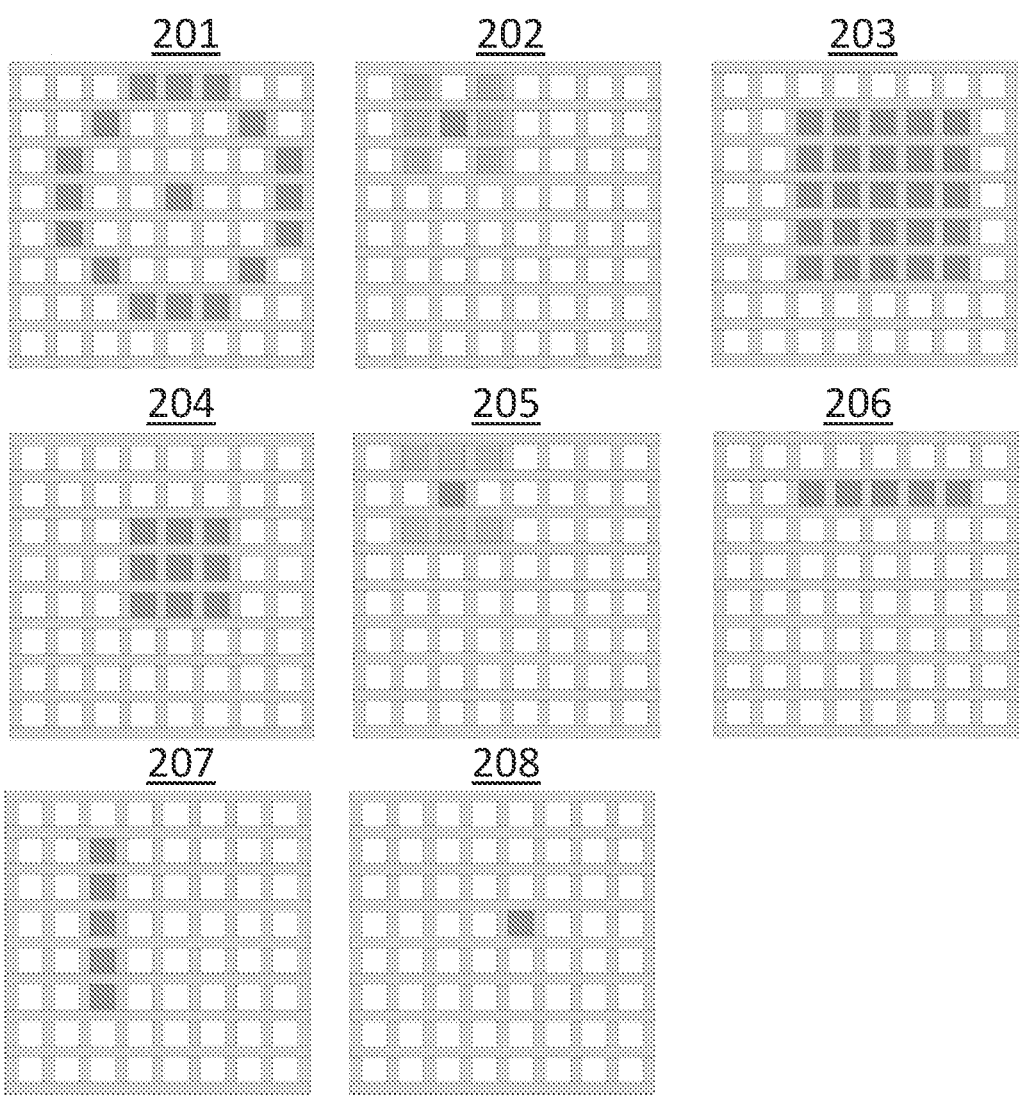
FIG. 4 discloses a collection of patterns.

According to some examples, and as shown in FIG. 4, the reading pattern may comprise at least one of a Single Fast Pattern 201, a Single Sobel X Filter 202, a Patch Pattern 203, a Single NMS Pattern 204, a Single Sobel Y Filter 205, a Row Pattern 206, a Column Pattern 207, a Scalar Pattern 208 and/or any combination thereof.

Apart from these example patterns, the reading pattern may also comprise a BRIEF-algorithm pattern alone or in combination.

As the image processing method supports both single cycle scalar accesses, single regular patterns, and multiple non-contiguous accesses as a combination of many patterns together, it has a high flexibility.

The flexibility in pattern selection may be advantageous as it dramatically increases memory bandwidth, enabling parallelization of many algorithms related to image processing, including feature extraction and descriptor generation.

Figure 2:
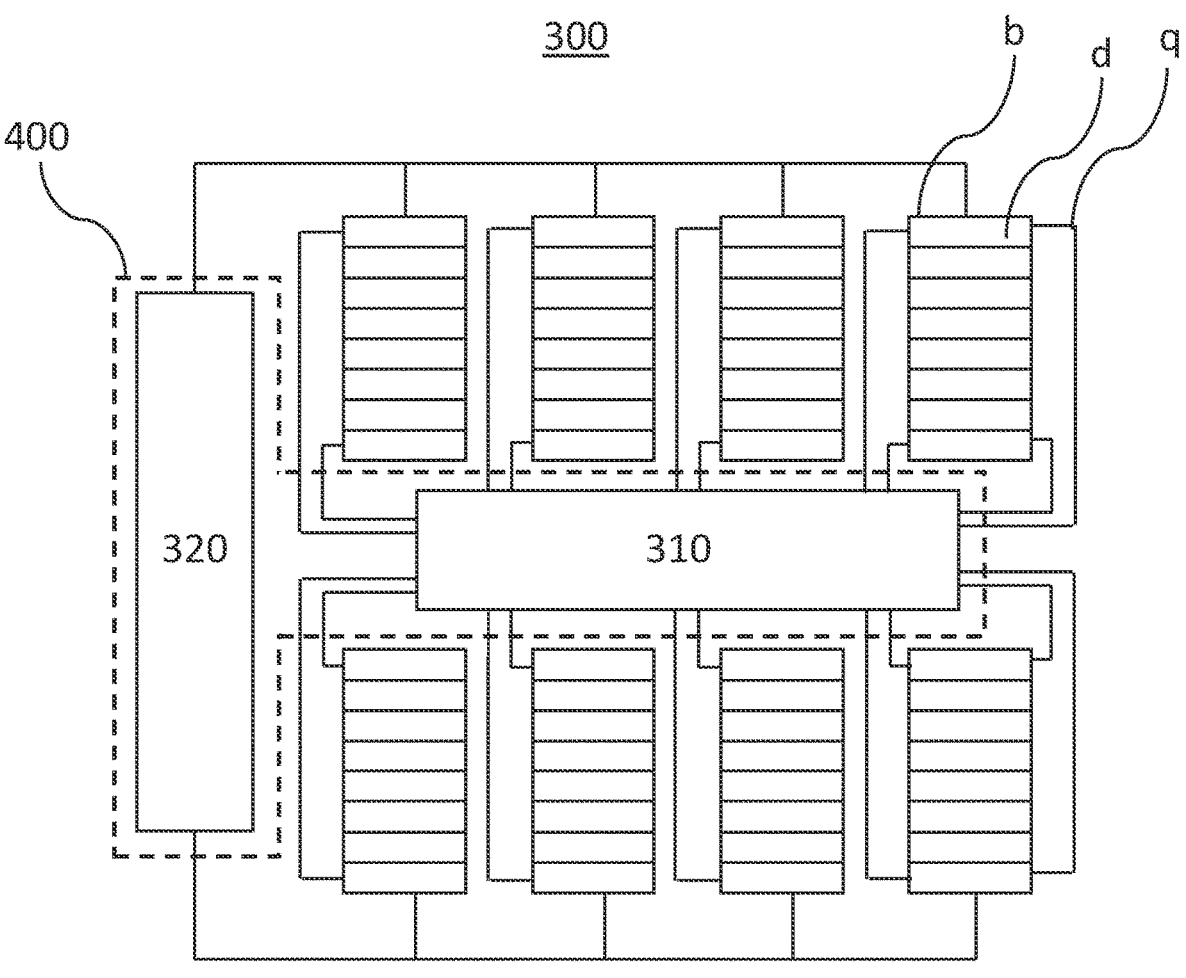
FIG. 2 discloses a memory organization.

FIG. 2 shows a system for image processing 300. The system for image processing 300 comprises a plurality of memory banks b, each memory bank b comprises memory bank rows d. The system further comprises an image controller 400 configured to divide the image into a plurality of tags t comprising tag rows r, comprising a plurality of pixels p, and further configured to distribute each tag row r over different memory banks b such that each tag row of the tag t is accessible to be read out from the memory banks b simultaneously.

This may be advantageous as it allows transformation from pixel to memory location in an efficient way and thereby reducing the amount of memory access.

According to some examples, the image controller 400 may be further configured to distribute the tag rows r in order starting from a first tag row r and to the memory banks b in order starting at the first memory bank b, until all tag rows r have been distributed.

Such a distribution may reduce the amount of memory accesses as it avoids greatly the necessity of rereads.

Specifically, if the number of tags is K and the number of tag rows is M, the image controller 400 may be further configured to distribute the pixels p from a tag index T(t,r) to a memory bank index B(b,d) by a first increment of one from 1 to M by tags rows r and memory banks b, then by a second increments of one step by tags t and memory bank rows d, and then iterating the first and second increments alternatingly until t=K and r=M.

According to some examples, the image controller 400 may be further configured to distribute the tag rows r in a shuffled order such that only pixels p belonging to a certain reading pattern 201 is sorted out during the step of performing a readout of the image S2010.

According to some examples, there may be at least a same number of memory banks b as tag rows r. Additional memory banks can be used to accommodate a higher throughput of a hardware accelerated implementation without loss of generality. Alternatively, number of tags per image row may be equal to an uneven quotient of number of pixels per row and word length, making for instance the number of tags per row a multiple of power of two, simplifying the implementation of the address generation unit.

According to some examples, the system may comprise an address generation unit 310 configured to assign each memory bank row d a tag index T(t,r), a tag row offset and a byte offset.

This may be advantageous as it allows transformation from pixel to memory location to be implemented efficiently in hardware, and thereby saving power.

According to some examples, the system may comprise a shuffling network 320 configured to readout specified pixel information in a requested reading pattern 201 of the tag t stored in the different memory banks b.

This may be advantageous as the readout can be performed on a reduced set of pixels, and ultimately saving power. More specifically, the readout may comprise a step of determining which addresses must be fetched, followed by selecting the appropriate pixels given the pattern.

As shown in FIG. 4, the reading pattern may comprise at least one of a Single Fast Pattern 201, a Single Sobel X Filter 202, a Patch Pattern 203, a Single NMS Pattern 204, a Single Sobel Y Filter 205, a Row Pattern 206, a Column Pattern 207, a Scalar Pattern 208 and/or any combination thereof. Apart from these example patterns, the reading pattern may comprise a BRIEF-algorithm pattern.

As the system supports both single cycle scalar accesses, single regular patterns, and multiple non-contiguous accesses as a combination of many patterns together, it has a high flexibility.

The flexibility in pattern selection may be advantageous as it dramatically increases memory bandwidth, enabling parallelization of many algorithms related to image processing, including feature extraction and description generation. Alternatively, the readout can be performed by a crossbar network or any other suitable component for the purpose.

According to some examples, at least one port connected to each memory bank such that at least one memory bank row can be read out simultaneously. This may be advantageous as the readout can be performed in a flexible way.

The number of ports may be equal to the number of memory banks but may alternatively be of a greater number, enabling a certain range of elements being fetched at once. Multiple ports may be connected to each memory bank.

Additional ports can be used to accommodate a higher possible number of patterns and pixels read in one clock cycle and thereby increasing throughput.

Figure 5:
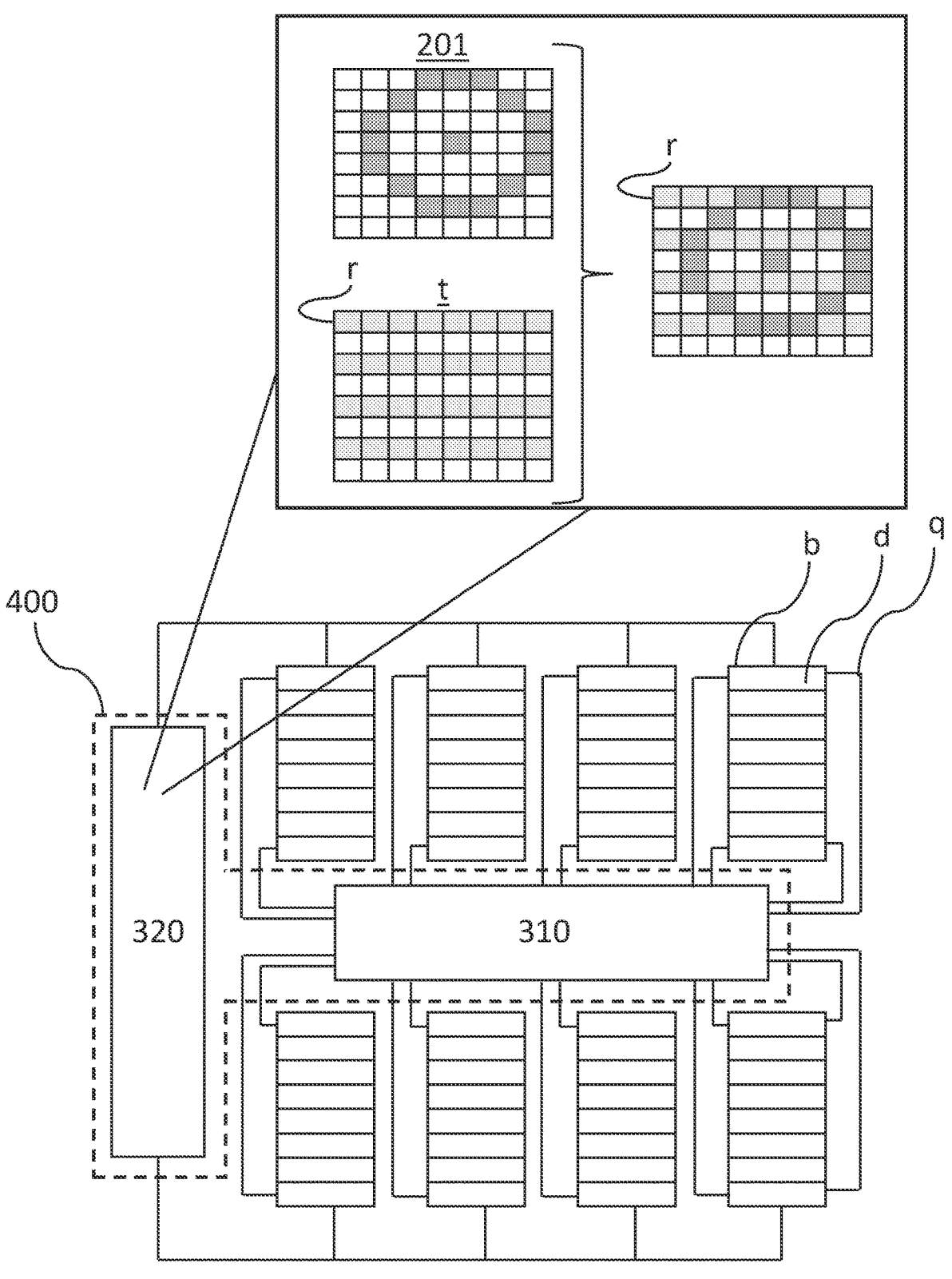
FIG. 5 discloses a memory organization performing a processing step on a tag of an image, and FIG. 6 discloses an autonomous vehicle comprising a system of memory organization.

FIG. 5 shows a system 300 according to an example, performing a processing step of an image processing method on a tag t of an image 100. In this example, the shuffling network 320 is performing a readout S2010 of the image 100 by sorting out specified pixel information in a requested reading pattern 201 of a tag t stored in the memory banks b.

Figure 6:
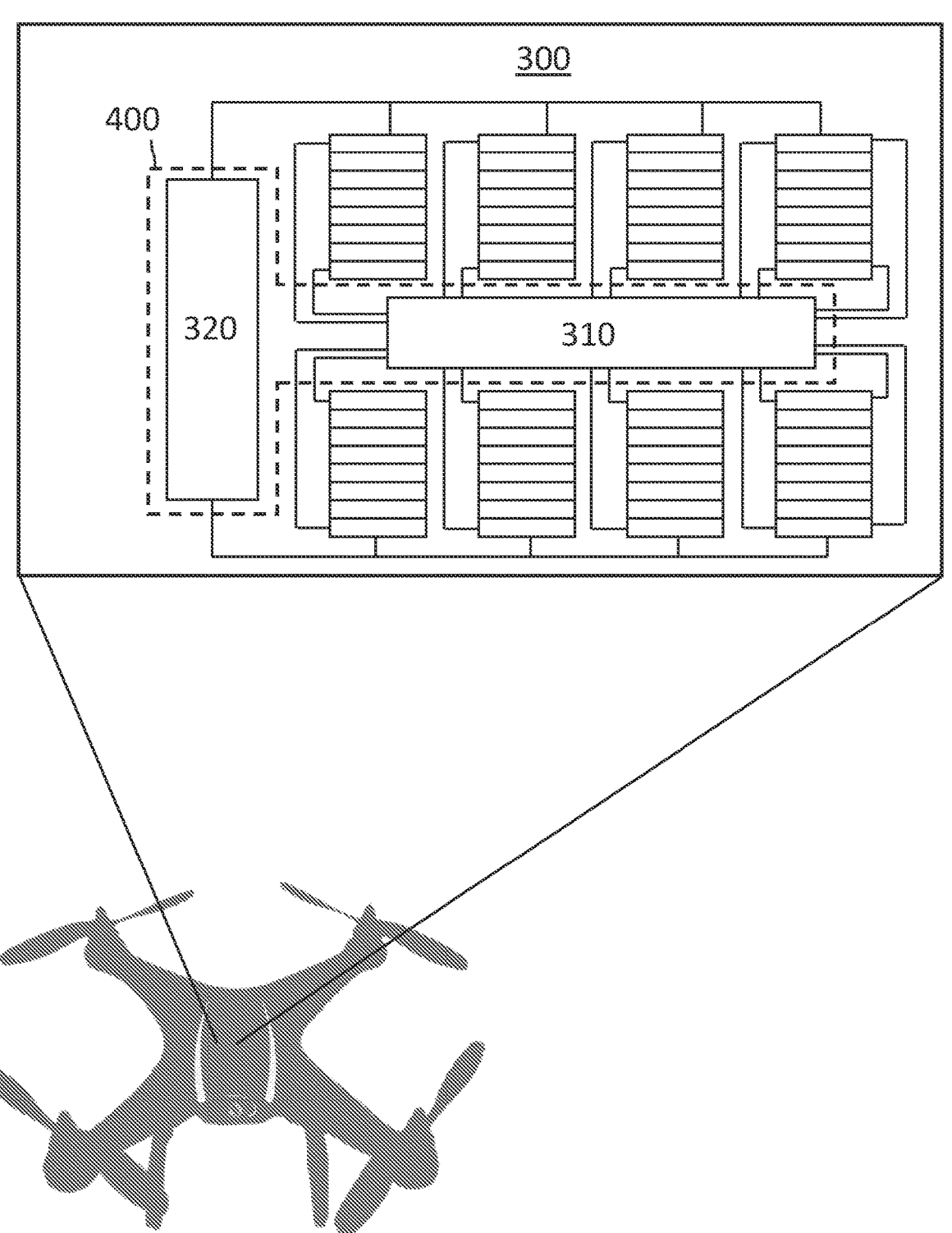

FIG. 6 shows an autonomous vehicle comprising a system for image processing 300 as described above and further disclosed in FIG. 2.

For autonomous vehicles, drones, augmented reality devices and many other devices, it may be advantageous with a robust, fast, and efficient image processing. These systems must typically perform several difficult and computationally intensive tasks in real-time, with a limited energy budget and limited physical size.

Specifically, autonomous drones and augmented reality devices, typically has a small physical size and a limited battery capacity, and it is of great importance to be able to carry out image processing efficiently with low power consumption.

Vision based autonomous systems is just one example of systems performing feature extraction in large images, summarizing images into fragments etc. Typically, such operations contribute to a significant amount of the processing time and power consumption of the system, so it is advantageous to improve the performance.

For even further improved image processing performance may the herein discussed image processing method or system be combined with a convolution accelerator system. The convolution accelerator system is discussed in more detail in the application with the title "SYSTEM AND METHOD FOR CONVOLUTION OF AN IMAGE" filed on the same day as this application and by the same inventors.

The person skilled in the art realizes that the present disclosure by no means is limited to the examples described above. On the contrary, many modifications and variations are possible within the scope of the appended claims Additionally, variations to the disclosed examples can be understood and effected by the skilled person in practicing the claimed invention, from a study of the drawings, the disclosure, and the appended claims.

The invention claimed is:

1. An image processing method, the method comprising:
allocating (S1010) a plurality of memory banks (b), wherein each memory bank (b) comprises a plurality of memory bank rows (d);
dividing (S1020) an image into a plurality of tags (t), such that a width of the image is divided into several of the tags (t), wherein each tag (t) comprises tag rows (r), and each tag row (r) comprises a plurality of pixels (p);
consecutively distributing (S1030) each tag row (r) over different memory banks (b) such that each tag row (r) of the tag (t) is accessible to be read out from the memory banks (b) simultaneously;
wherein the consecutive distribution of the tag rows is performed by distributing the tag rows (r) in order starting from a first tag row (r) and to the memory banks (b) in order starting at a first memory bank (b), until all tag rows (r) have been distributed; and
performing a readout (S2010) of the image 100 by sorting out specified pixel information in a requested reading pattern (201) of the tag (t) stored in the different memory banks (b), wherein the requested reading pattern comprises a geometric arrangement of a subset of the pixels.

2. The image processing method according to claim 1, wherein each memory bank row (d) comprises a tag index T(t,r), tag row offset, and a byte offset.

3. The image processing method according to claim 1, wherein the step of performing a readout (S2010) comprises accessing the memory banks (b) by at least one port (q) connected to the memory banks (b) such that at least one memory bank row (d) can be read out simultaneously.

4. The image processing method according to claim 1, wherein the geometric arrangement comprises a binary robust independent elementary features (BRIEF) access pattern.

5. The image processing method according to claim 1, wherein the geometric arrangement comprises a Bresenham circle.

6. A system for processing an image (300), comprising:
a plurality of memory banks (b), wherein each memory bank (b) comprises memory bank rows (d);
an image controller (400) configured to divide an image into a plurality of tags (t), such that a width of the image is divided into several of the tags (t), wherein each tag (t) comprises tag rows (r), and each tag row (r) comprises a plurality of pixels (p), and consecutively distributing each tag row (r) over different memory banks (b) such that each tag row (r) of the tag (t) is accessible to be read out from the memory banks (b) simultaneously;
wherein the image controller (400) is further configured to distribute the tag rows (r) in order starting from a first tag row (r) and to the memory banks (b) in order starting at a first memory bank (b), until all tag rows (r) have been distributed; and
a shuffling network (320) configured to readout specified pixel information in a requested reading pattern (201) of the tag (t) stored in the different memory banks (b), wherein the requested reading pattern comprises a geometric arrangement of a subset of the pixels.

7. The system according to claim 6, the system further comprising an address generation unit (310) configured to assign each memory bank row (d) a tag index T(t,r), a tag row offset and a byte offset.

8. The system according to claim 6, the system further comprising at least one port connected to each memory bank such that at least one memory bank row (d) can be read out simultaneously.

9. The system according to claim 6, wherein the geometric arrangement comprises a binary robust independent elementary features (BRIEF) access pattern.

10. The system according to claim 6, wherein the geometric arrangement comprises a Bresenham circle.

* * * * *